Figures 1, 1A, 2:
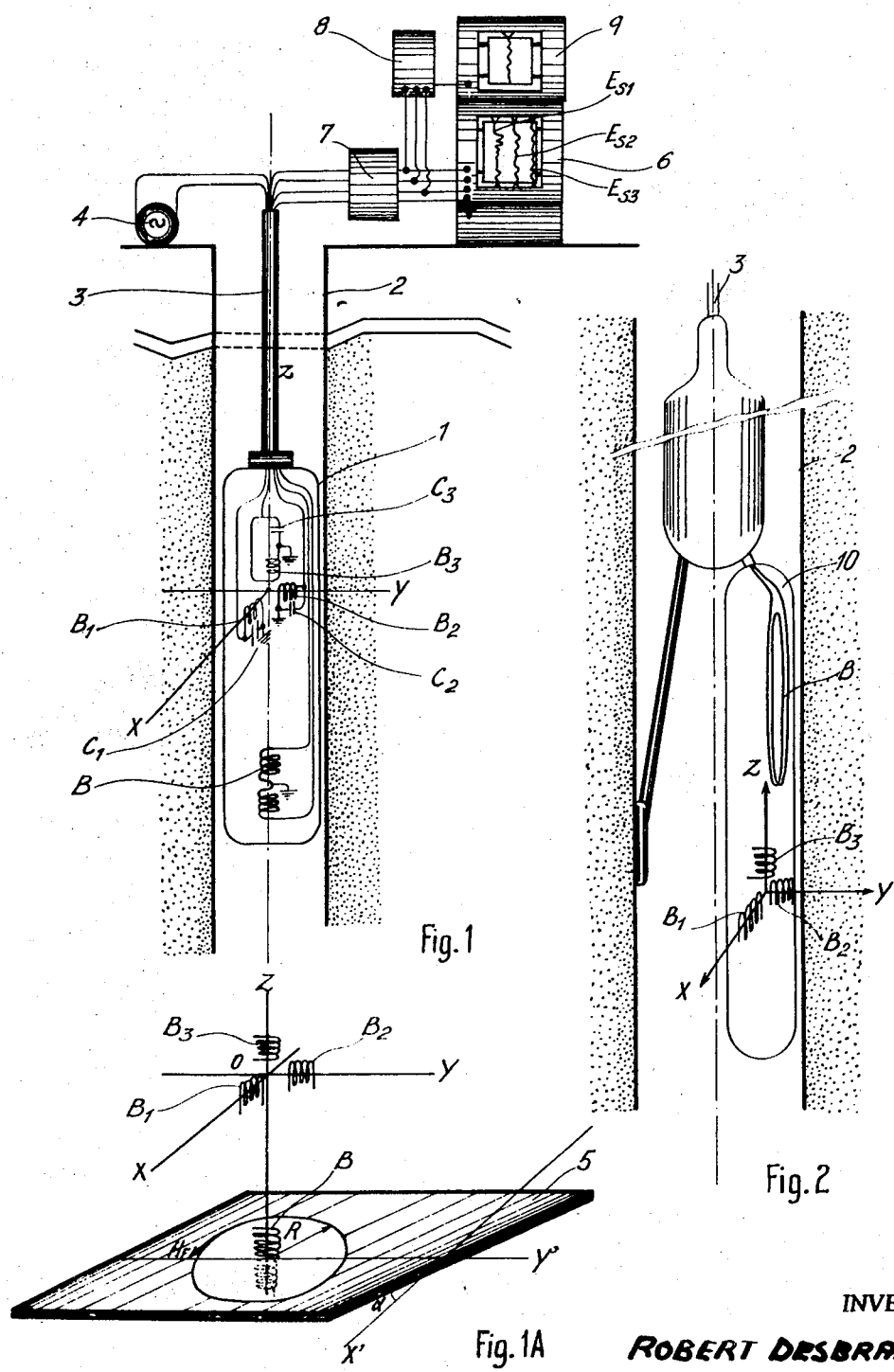

United States Patent

[11] 3,609,521

| [72] | Inventor | Robert Desbrandes |
| | | Montesson, France |
| [21] | Appl. No. | 743,198 |
| [22] | Filed | July 8, 1968 |
| [45] | Patented | Sept. 28, 1971 |
| [73] | Assignee | Institut Francais Du Petrole Des Carburants Et Lubrifiants Rueil Malmaison (Hauts de Seine), France |
| [32] | Priority | July 12, 1967 |
| [33] | | France |
| [31] | | 114175 |

[54] ELECTROMAGNETIC LOGGING DEVICE AND METHOD UTILIZING THREE MUTUALLY PERPENDICULAR COILS FOR DETERMINING THE DIP OF DISCONTINUITIES IN THE ELECTRICAL RESISTIVITY OF UNDERGROUND FORMATIONS
9 Claims, 2 Drawing Figs.

[52] U.S. Cl............................................................ 324/6
[51] Int. Cl.......................................................... G01v 3/10, G01v 3/18
[50] Field of Search............................................ 324/6, 8

[56] References Cited
UNITED STATES PATENTS

| 2,468,968 | 5/1949 | Felch, Jr. et al. | 324/8 X |
| 2,359,894 | 10/1944 | Brown et al. | 324/8 |
| 3,187,252 | 6/1965 | Hungerford | 324/6 |
| 3,389,331 | 6/1968 | Vexler | 324/8 |
| 3,391,335 | 7/1968 | Patton et al. | 324/8 |
| 3,510,757 | 5/1970 | Huston | 324/6 |

FOREIGN PATENTS

| 145,940 | 7/1962 | U.S.S.R. | 324/6 |

Primary Examiner—Gerard R. Strecker
Attorney—Craig, Antonelli, Stewart & Hill

ABSTRACT: The presence of discontinuities in the areas of the earth surrounding a borehole are determined through induction logging. Three mutually perpendicular induction coils are spaced along the axis of the borehole from a transmitter coil. The signals generated by the transmitter coil are transmitted in a direction parallel to the axis of the borehole. By measuring the ratio of the magnitude of the signals received at the mutually perpendicular receiving coils, the electrical discontinuity in the area surrounding the borehole can be determined as a function of the dip of the discontinuity.

PATENTED SEP 28 1971 3,609,521

INVENTOR
ROBERT DESBRANDES

BY Craig & Antonelli
ATTORNEYS

ELECTROMAGNETIC LOGGING DEVICE AND METHOD UTILIZING THREE MUTUALLY PERPENDICULAR COILS FOR DETERMINING THE DIP OF DISCONTINUITIES IN THE ELECTRICAL RESISTIVITY OF UNDERGROUND FORMATIONS

The present invention relates to a logging device for detecting and determining electrical discontinuities in the areas of the earth surrounding a borehole.

The sonde used in the logging device according to the invention is of a type including in combination means for transmitting electric currents into the ground, means for determining the direction and magnitude of the resulting magnetic field at least at one location positioned in spaced relationship to said transmitting means, inside the borehole, in particular in the vicinity of the borehole wall.

The transmitting means may include at least one induction coil the axis of which is preferably parallel to the axis of one of the receiving coils. This embodiment of an electric sonde has the advantage of not requiring any electric contact with the borehole wall.

This embodiment of a sonde according to the present invention is thus of the induction type, but differs from conventional induction sondes by the means for receiving the signal.

The conventional induction sondes essentially include a transmitter coil generating an alternating electromagnetic field having generally a frequency of about 20,000 Hertz and a receiver coil having the same axis as the transmitter coil and located at some distance therefrom. The resulting magnetic field induces eddy currents in the formations of the earth surrounding the borehole, the paths followed by these currents having generally the shape of rings coaxial with the transmitter coil.

These eddy currents induce in turn an electric signal in the receiver coil, the intensity of this signal being substantially proportional to the electrical conductivity of the geological formations located at the level of the sonde and, thus inversely proportional to the electrical resistivity of these formations.

This signal is easily separated from the one resulting of the direct inductive coupling between the transmitter coil and the receiver coil: the signal transmitted through the geological formations is in phase-opposition with the transmitted signal, in accordance with the laws of induction, while the ratio of the intensity of the signal resulting from the direct coupling between transmitter coil and receiver coil to the intensity of the transmitted signal remains constant, so that this signal resulting from direct coupling can be easily suppressed.

This type of sonde according to the invention differs from a conventional induction sonde in that it includes, instead of the single receiver coil of this conventional induction sonde a receiving device which may be constituted of three coils the axes of which are at right angles to one another, one of this coil being positioned along the axis of the sonde, this device being adapted to measure both the direction and magnitude of the magnetic field at the location of this receiving device.

In a more particularly preferred embodiment of the invention, the receiving device of the sonde will be adapted to measure the ratio of the component of the magnetic field along the axis of the sonde to the component of this field in a plane perpendicular to this axis.

The invention will be described hereinunder more in detail, with reference to the attached drawings which illustrate very diagrammatically two embodiments of the invention which must not be considered as limitative, wherein:

FIG. 1 illustrates a first embodiment of the invention,

FIG. 1A is a diagrammatic view of FIG. 1, showing a plane discontinuity in the electric resistivity of the ground at the level of the sonde, FIG. 2A corresponds to a second embodiment of the invention, In FIG. 1, the reference numeral 1 designates a sonde according to the invention lowered into a borehole, at the lower end of a cable 3. This sonde includes an electric transmitter coil B, which is electrically connected with the low frequency current generator 4, through the cable 3.

The frequency of the current may be comprised between 1,000 and 500,000 Hertz, preferably between 10,000 and 50,000 Hertz.

The device for detecting the magnetic field, located at some distance from the transmitting device, includes three electric circuits tuned to the frequency of transmission (circuits with self-inductances and condensators connected in parallel: $B_1$, $C_1$; $B_2$, $C_2$; $B_3$, $C_3$) the coils $B_1$, $B_2$ and $B_3$ of these circuits having their axes respectively in alignment with three measurement axes $Ox$, $Oy$ and $Oz$ at right angles to one another, the axis $Oz$ coinciding with the axis of the sonde.

The coil $B_3$ thus corresponds to the single receiver coil of a conventional induction sonde.

The signals received by the three coils respectively are transmitted to the ground surface through the cable 3 and may be simultaneously recorded by the recording device 6, after suitable amplification by the amplifying device 7.

If the geological formation at the level of which the sonde is located is homogeneous, no signal will theoretically be received by the coils $B_1$ and $B_2$, only the coil $B_3$ receiving a signal which is induced by the eddy currents which flow through the formation along loops having the same axis as the bore hole.

If in practice a weak parasitic signal is picked up by the coils $B_1$ and $B_2$ when the geological formation is homogeneous, this signal may be easily cancelled by known means, since its ratio to the transmitted signal remains substantially constant.

If, on the contrary, the formation at the level of the sonde exhibits discontinuities in their electrical resistivity, these discontinuities being not horizontal and resulting for instance from fractures or cracks filled with an insulating liquid or of changes in the nature of the geological strata, this will induce a signal in one at least of the coils $B_1$ or $B_2$, which will enable these discontinuities in the electrical resistivity to be detected.

In the following there is contemplated, by way of example, the case of a plane electrically conductive layer 5 (FIG. 1A), which separates layers of higher electrical resistivity.

Some of the formulas which will be used hereinunder to express the value of the magnetic field are strictly valid only if the transmitted electric current is a direct current.

However they will remain valid with a good approximation for the low frequencies of emission (up to 1,000 Hertz).

For higher frequencies it is necessary to introduce correcting factors which take into account the value of the frequency of emission.

However the fact that the application of the formulas which are given hereinunder implies a sufficiently low frequency of emission does not constitute any limitation of the invention.

The magnetic field produced in the geological formations located in the vicinity of the borehole, at a distance R (meters) from the axis of this borehole has the following value at a given instant $$H_f \text{ (ampere/m.)} = n\frac{I}{2} \frac{r^2}{(R^2+r^2)^{3/2}}$$

wherein $r$ is the radius, expressed in meters, of the winding which constitutes the transmitter coil B, $n$ the number of convolutions or turns of this winding and $I$ the intensity of the current flowing through this coil at the instant when this magnetic field is produced.

The corresponding value of the induction in the geological formations is:

$$B_f(\text{Weber}/m.^2) = 4\pi 10^{17} H_f$$

The value of the magnetic flux through a plane loop having a radius of curvature equal to $R$ and which is located in the plane layer 5, is:

$$\Phi_f = B_f \cdot S \cdot \cos\alpha,$$

wherein $S$ is the area limited by this loop and $\alpha$ the angle of inclination of the axis of the transmitter coil, with respect to a perpendicular to the plane of this layer.

It results therefrom that $$\Phi_f(\text{Weber}) = B_f \pi R^2 \cos\alpha$$

The value of the electromotive force induced in this loop of geological formation is $$E_f = -(d\Phi/dt) = -\omega\Phi_f$$

$\omega$ being the angular frequency of the emitted current, which is supposed to be sinusoidal.

The value of the corresponding induced current is $$I_f(\text{Ampree}) = (E_f/\rho) \qquad (5)$$

$\rho$ being the electrical resistivity of the geological formation, expressed in Ohm. meters.

The relation (5) may be written as follows, taking into account the preceding relations $$I_f = \frac{-10^{-7}\omega\pi^2 R^2 n I r^2}{\rho(R^2+r^2)^{3/2}} \cos\alpha \qquad (6)$$

The magnetic field produced by this current circulating along a loop in the geological formation has the following value at a point located on the axis of this loop $$H_s \text{ (ampere/m.)} = \frac{I_f}{2} \frac{R^2}{(R^2+r^2)^{3/2}} \qquad (7)$$

The corresponding electromagnetic induction is:

$$B_s = 4\pi 10^{17} H_s \qquad (8)$$

The induction flux traversing the receiver coil $B_3$, the radius of curvature of which is $r_3$ and which includes $n_3$ turns is equal to $$\Phi_{s3} = n_3 B_s (\pi r_3^2) \cos\alpha \qquad (9)$$

The expression of the corresponding electromotive force generated in the coil $B_3$ is $$E_{s3} = -Q_3(d\Phi_{s3}/dt) = Q_3\Phi_{s3} \qquad (10)$$

Finally it comes:

$$E_{s3} = \frac{-2\pi^4 10^{-4}\omega^2 n n_3 r^2 R^4 r_3^2 Q_3 I}{\rho(R^2+r^2)^{3/2}} \cos^2\alpha$$

Similarly the induction flux which traverses a second receiver coil the axis of which is perpendicular to that of $B_3$ and located in the plane containing the axis of $B_3$ and a parallel to a dip line of the layer 5 (this second receiver coil is supposed to be the coil $B_1$, in the example of FIG. 1A), has the following expression:

$$\Phi_{s1} = n_1 B_s (\pi r_1^2) \sin\alpha \qquad (10)$$

$r_1$ being the radius of the coil $B_1$ and $n_1$ the number of turns of this coil.

Therefrom is deduced the expression of the corresponding electromotive force induced in the coil $B_1$ $$E_{s1} = -\frac{Q_1 d\phi_{s1}}{dt} = \omega Q_1 \phi_{s1}$$

$$= \frac{2\pi^4 10^{-14} \omega^2 n n_1 r^2 R^4 r_1^2 Q_1 I}{(R^2+r^2)^{3/2}} \cos\alpha \cdot \sin\alpha \qquad (11)$$

$Q_1$ being the quality factor of the coil $B_1$

This gives the relation:

$$\frac{E_{s1}}{E_{s3}} = \frac{Q_1 n_1 r_1^2}{Q_2 n_2 r_3^2} \tan\alpha \qquad (12)$$

The value of the ratio $E_{s1}/E_{s2}$ is independent of the electrical resistivity of the formation (5) and of the intensity of the transmitted signal; it only depends on the characteristics of the coils $B_1$ and $B_3$ and of the dip of the formation 5.

More generally, irrespective of the orientations of the axes of the two coils $B_1$ and $B_2$ with respect to a perpendicular to a line of greatest slope of the plane layer 5 it can be verified that, if $r_2$ is the radius of the coil $B_2$ and $n_2$ the number of turns of this coil $$\frac{\sqrt{E_{s1}^2 + E_{s2}^2}}{E_{s3}} = \frac{\sqrt{n_1^2 r_1^4 + n_2^2 r_2^4}}{n_3 r_3^2} \tan\alpha = k \tan\alpha \qquad (13)$$

wherein $k$ is a constant factor of the apparatus, $E_{s2}$ being the electromotive force induced in the coil $B_2$.

As a result of the shape of the curve representing the value of $\tan\alpha$ as a function of $\alpha$, the determination according to the invention of the ratio $$\frac{\sqrt{E_{s1}^2 + E_{s2}^2}}{E_{s3}}$$

of the signals $E_{s1}$, $E_{s2}$, $E_{s3}$ which will appear respectively in the three coils $B1$, $B_2$, $B_3$ will give a single value for the dip $\alpha$ of the studied formation.

The sonde will be provided with nonillustrated means, which may be of any known conventional type, for locating the level of the sonde in the bore hole 2 at the instant of measurement.

This sonde may also be provided with any suitable device for determining from the surface level the respective orientations azimuth of the axes of measurement, for example a gyroscopic device or a compass of a type used in conventional dipmeters.

This sonde may also be provided with a device for measuring the deviation of the bore hole with respect to the vertical.

An electronic device 8 of a known type, such as for example an analog computer will directly determine the above ratio, the value of which will appear on a recorder 9, which will permit a direct reading of the respective dips of the discontinuities in the electrical resistivities of the geological formations traversed by the bore hole 2.

In a first way of operating the logging device according to the invention the sonde will be rotated about its axis at each level in the borehole until the signal picked up by one of the coils, for example $B_2$, is equal to zero. In this position of the sonde, which may be determined from the surface by conventional means as hereinabove indicated, the axis of the coil $B_2$ in which no signal appears is directed at right angles to a dip line of a plane of electrical discontinuity of the geological formations located at the level of the sonde (FIG. 1A). The dip tan $\alpha$ of this discontinuity, which substantially complies with the relation $$(Esl/E_{s3}) = k\tan\alpha$$

wherein $E_{sl}$ and $E_{s2}$ are the signals which respectively appear in the coils $B_1$ and $B_3$, will be read directly on the recorder 9.

The geometrical configuration of the electrical discontinuity will then be perfectly defined.

In a second way of operating the sonde, corresponding to the case where the azimuthal orientation of the dip of the electrical discontinuities is not investigated, there will be read on the recorder 9 for the different levels in the borehole and for any orientation of the sonde about its axis, the value of tan $\alpha$ defined by the relation $$\frac{\sqrt{E_{s1}^2 + E_{s2}^2}}{E_{s3}} = k \tan\alpha$$

FIG. 2 illustrates another embodiment of the invention, wherein the transmitter coil $B$ has an horizontal axis and is of circular or oval shape.

The measuring receiver coils or solenoids are located in a pad 10 which is in contact with the wall of the borehole 2.

In the illustrated embodiment, the axis of the transmitter coil is parallel to the axis $Oy$ of the coil $B_2$.

If the geological formation located in contact with the sonde is of homogeneous electrical conductivity, no electric voltage will be induced in the coils $B_1$ and $B_3$.

The presence of discontinuities in the electrical resistivity, which is for example due to cracks or oblique clay bedding, induces electrical signal in both coils $B_1$ and $B_3$.

Such an embodiment of a logging device according to the invention, with one or several pads applied against the borehole wall, permits to very accurately locate the discontinuities in the electrical resistivity, particularly the cracks located in the immediate vicinity of the borehole.

I claim:

1. Logging device for detecting and determining electrical discontinuities in the areas of the earth surrounding a borehole by means of a sonde lowered into the borehole, said device including means having an axis of symmetry for transmitting into the ground electric currents, means for measuring the magnetic field produced by said currents at a measuring point in spaced relationship to said transmitting means and located within the borehole, said measuring means including a first electric coil means placed in a direction parallel to the borehole axis, a second and a third coil means, the axes of which are perpendicular to each other and to the axis of said first coil and means for determining the dip of the electrical discontinuities as a function of the ratio of the amplitude of the components of the magnetic field depicted by said coil means.

2. Logging device according to claim 1, further including means for rotating said sonde about its axis.

3. A logging device according to claim 1, wherein the electric currents are transmitted at a frequency between 1,000 and 500,000 Hz.

4. A logging device according to claim 3, wherein the electric currents are transmitted at a frequency between 10,000 and 50,000 Hz.

5. Logging device for detecting and determining electrical discontinuities in the areas of the earth surrounded by a borehole, by means of a sonde lowered into the borehole, said device including means having an axis of symmetry for transmitting into the ground alternating electric currents, means for measuring the magnetic field produced by these currents at a measuring point in spaced relationship to said transmitting means and located inside said borehole, said means including a first electric coil means placed in a direction parallel to, said axis of symmetry, a second and a third coil means, the axes of which are perpendicular to each other and to the axis of said first coil, all of these coils belonging respectively to three detecting circuits tuned to the transmitting frequency, and means for determining the dip of the electrical discontinuity as a function of the ratio of the amplitude of the signal received by said first coil to the square root of the sum of the squares of the respective amplitudes of the signals which are picked-up by said second and said third coil means.

6. Method for detecting and determining electrical discontinuities in the areas of the earth surrounding a borehole, by using a sonde located in the borehole, said sonde including a first electrical coil means having an axis placed in a direction parallel to the borehole axis, a second and a third coil means, the axes of which are both perpendicular to the axis of the first coil means, comprising the steps of transmitting electrical currents into the ground from a transmitter means located in the borehole, said transmitter means having an axis of symmetry parallel to the axis of the borehole, detecting three electrical signals received by said first, second and third coil means respectively in response to the transmission of said electrical currents through the earth, measuring, as a function of said three electrical signals, the magnetic field at a point located inside the borehole, in spaced relationship to the point where said currents are transmitted, in the form of the components of said field respectively along the axis of symmetry and in a plane perpendicular to said axis and determining the ratio of the amplitudes of said components, said ratio having a finite value different from zero when the emission of the currents if effected in the vicinity of an electrical discontinuity in the ground surrounding the borehole and deriving from the value of said ratio the dip of said discontinuity.

7. A method according to claim 6, wherein the electrical currents are transmitted at a frequency between 1,000 and 500,000 Hz.

8. The method according to claim 7, wherein the electrical currents are transmitted at a frequency between 10,000 and 50,000 Hz.

9. A method for determining the dip of electrical discontinuities in the areas of the earth surrounding the borehole, by using a sonde located in the borehole, said sonde including a first electrical coil means having an axis placed in a direction parallel to the borehole axis, a second and a third coil means the axes of which are both perpendicular to the axis of said first coil means, comprising the steps of transmitting into the ground electrical currents having an axis of symmetry whose direction is substantially parallel to the borehole axis from a point in spaced relationship to said coil means, detecting corresponding signals in said second and third coil means, said signals indicating the presence of an electrical discontinuity at the level of the sonde, and the ground surrounding the borehole, rotating the sonde about its axis, while keeping said sonde at the same level in the borehole, until the signal detected by said second coil means is substantially reduced to zero and then determining the ratio of the amplitude of the signal detected by said first coil means to the amplitude of the signal detected by said third coil means, said ratio being a function of the dip of said electrical discontinuity.